(12) United States Patent
Kotecha et al.

(10) Patent No.: US 10,193,995 B2
(45) Date of Patent: Jan. 29, 2019

(54) CONTROLLING UTILIZATION OF NETWORK PATHS FOR MACHINE-TYPE COMMUNICATIONS

(71) Applicant: Verizon Patent and Licensing Inc., Arlington, VA (US)

(72) Inventors: Lalit R. Kotecha, San Ramon, CA (US); Sagiv Draznin, Walnut Creek, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 101 days.

(21) Appl. No.: 15/189,475

(22) Filed: Jun. 22, 2016

(65) Prior Publication Data

US 2017/0374694 A1     Dec. 28, 2017

(51) Int. Cl.
*H04W 4/00*     (2018.01)
*H04L 29/08*    (2006.01)
*H04W 4/70*     (2018.01)
*H04W 76/11*    (2018.01)

(52) U.S. Cl.
CPC .............. *H04L 67/306* (2013.01); *H04W 4/70* (2018.02); *H04W 76/11* (2018.02)

(58) Field of Classification Search
None
See application file for complete search history.

(56) References Cited

U.S. PATENT DOCUMENTS

2014/0335791 A1*  11/2014  Kim ................. H04W 4/008
                                                455/41.2
2017/0318570 A1*  11/2017  Shaw ................. H04L 5/0053

* cited by examiner

*Primary Examiner* — Jason E Mattis
*Assistant Examiner* — Hong Shao (57) ABSTRACT

Systems described herein control communication paths used for machine-type communications (MTC) devices in a wireless network. The systems store a subscriber profile for an MTC device, including an APN configuration that differentiates, for non-IP-type communications, types of bearer paths between the MTC device and an ePC network; receive an attach request from the MTC device; retrieve the subscriber profile; and determine if the subscriber profile indicates an APN configuration for a non-IP bearer. When the subscriber profile indicates an APN configuration for a non-IP bearer, the systems identify in the subscriber profile an MTC-ePC delivery mechanism, between the MTC device and the ePC network, as a user plane or a control plane.

20 Claims, 11 Drawing Sheets

| Non-IP-PDN-Type-Indicator 410 | Non-IP-Delivery-Mechanism 420 | SCEF ID 430 | Non-IP-UE-Network-Delivery-Mechanism 440 |
|---|---|---|---|
| TRUE | SCEF | FQDN | CONTROL-PLANE |
| TRUE | SGi | -- | CONTROL-PLANE |
| TRUE | SGi | -- | USER-PLANE |

CONTROLLING UTILIZATION OF NETWORK PATHS FOR MACHINE-TYPE COMMUNICATIONS

BACKGROUND

The Internet of Things (IoT) may be described as a network of physical objects or "things" embedded with various types of electronics, software, sensors, logic, circuitry, etc., that can collect and exchange data. A "thing" (also referred to herein as a "machine-type communication (MTC) device") may connect to a service hosted on the Internet indirectly (e.g., via another network device, such as a coordinator, a gateway, etc.) or directly.

For network service providers, MTC support involves providing network services to potentially millions of MTC devices. Once MTC devices are delivered to market, it can be extremely difficult to control, configure and manage them, especially as many of the MTC devices may not support over-the-air updates. If MTC devices act unpredictably (e.g., due to malware, improper configuration, etc.), it may be extremely difficult for service providers to protect the network.

DETAILED DESCRIPTION OF THE PREFERRED EMBODIMENTS

The following detailed description refers to the accompanying drawings. The same reference numbers in different drawings may identify the same or similar elements.

Systems and methods described herein relate to controlling communication paths used for machine-type communications (MTC) devices. A communication path between a MTC device and another device, such as an application server, can be supported within a wireless core network in different ways, predominantly referred to as "control plane" and "user plane" paths. According to implementations described herein, a network can specify and control the path(s) to be used for an MTC device by leveraging a subscriber profile for the MTC device. The subscriber profile may enable the network to steer communications from MTC devices to the proper paths and allow the network to be manageable and efficient.

Figure 1:
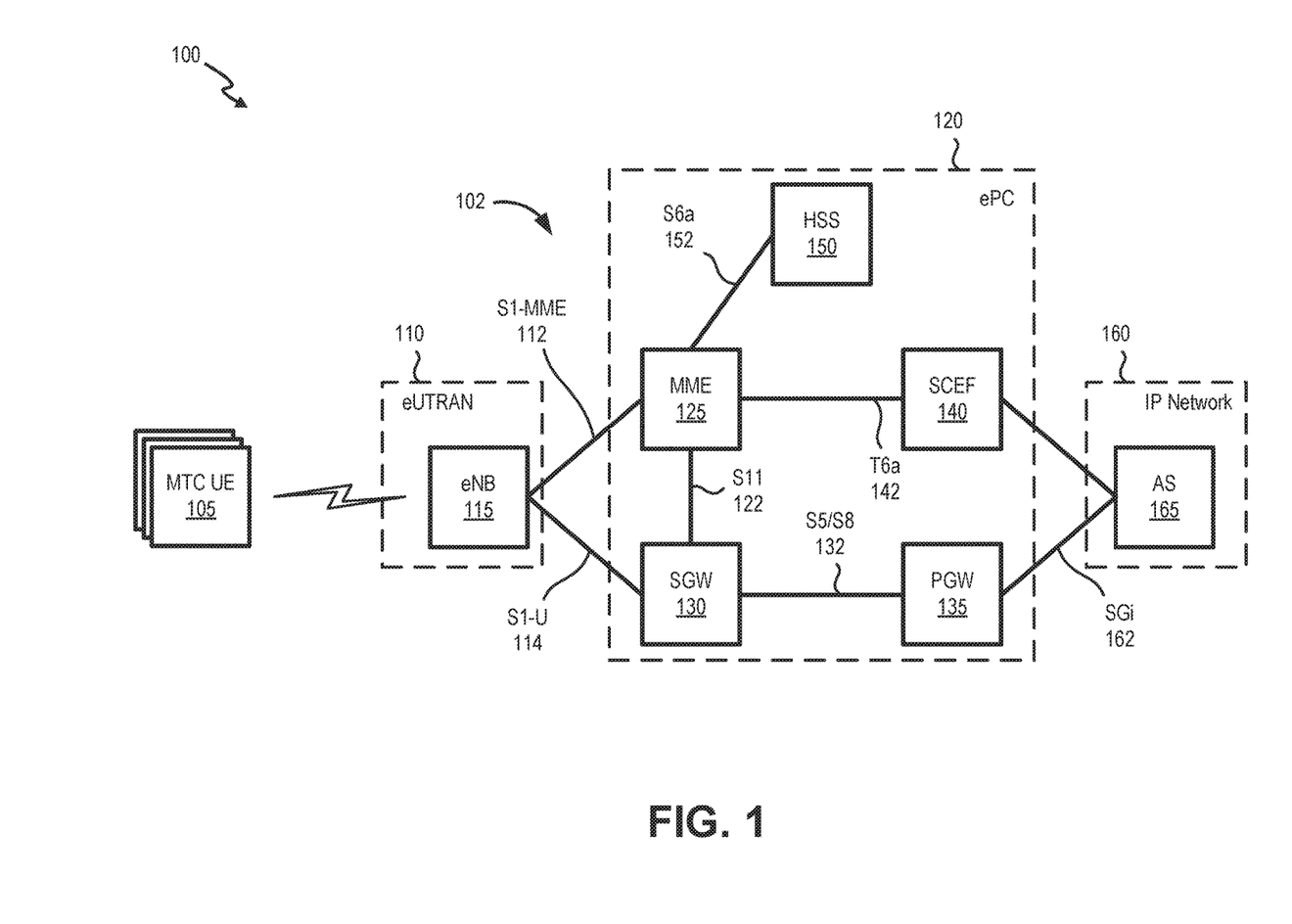
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include multiple MTC devices or MTC user equipment (UE) 105 (referred to collectively and generically as MTC UE 105); a wireless network 102 that may include an evolved UMTS Terrestrial Network (eUTRAN) 110; an evolved Packet Core (ePC) 120; and an Internet Protocol (IP) network 160.

Wireless network 102 may be a long term evolution (LTE) 4G wireless network and may include one or more devices that are physical and/or logical entities interconnected via standardized interfaces. Wireless network 102 provides wireless packet-switched services and wireless IP connectivity to user devices (such as MTC UE 105) to provide, for example, data, voice, and/or multimedia services. eUTRAN 110 may include one or more base stations 115 (e.g., an enhanced NodeB, also referred to herein as eNodeB or eNB 115). ePC 120 may further include a mobility management entity (MME) device 125, a serving gateway (SGW) device 130, a packet data network gateway (PGW) device 135, a service creation environment function (SCEF) 140, and a home subscriber server (HSS) device 150. The IP network 160 may further include one or more application servers (AS) 165. It is noted that FIG. 1 depicts a representative network environment 100 with exemplary components and configuration shown for purposes of explanation. Other embodiments may include additional or different network entities in alternative configurations than which are exemplified in FIG. 1.

MTC UE 105 may include a device that communicates with another device (e.g., a device connected to IP network 160) via machine-type communications. Such machine-type communications typically do not include manual human input. MTC UE 105 may include a wide range of applications for monitoring and control purposes in fields such as industrial automation, logistics, Smart Grid, Smart Cities, health, defense, agriculture, etc. MTC UE 105 may operate according to one or more versions of the LTE communication standard or other standards. In some instances, MTC UE 105 may generate short messages and/or infrequent messages to support a particular application. In other instances, MTC UE 105 may generate high bandwidth data or very frequent communication to support a particular application.

eNB 115 may include one or more devices and other components having functionality that allow MTC UE 105 to wirelessly connect to eUTRAN 110. eNB 115 may interface with ePC 120 via a S1 interface, which may be split into a control plane S1-MME interface 112 and a data (or user) plane S1-U interface 114. S1-MME interface 112 may interface with MME device 125. S1-MME interface 112 may be implemented, for example, with a protocol stack that includes a non-access stratum (NAS) protocol. S1-MME interface 112 may include multiple sub-parts, including an S1-AP interface that fulfills the S1 interface functions such as bearer management functions, initial context transfer function, mobility functions, reset functionality, NAS signaling transport function, error reporting, etc. S1-U interface 114 may interface with SGW 130 and may be implemented, for example, using a General Packet Radio Service Tunneling Protocol version 2 (GTPv2).

MME device 125 (also simply referred to as MME 125) may include a network device to implement control plane processing for ePC 120. For example, MME 125 may implement tracking and paging procedures for MTC UE 105, may activate and deactivate bearers for MTC UE 105, may authenticate a user of MTC UE 105, and may interface to non-LTE radio access networks. A bearer may represent a logical channel with particular quality of service (QoS) requirements. MME 125 may also select a particular SGW 130 for a particular MTC UE 105. A particular MME 125 may interface with other MME devices 125 (not shown) in ePC 120 and may send and receive information associated with UEs, which may allow one MME device to take over control plane processing of UEs serviced by another MME device, if the other MME device becomes unavailable.

SGW device 130 (also simply referred to as SGW 130) may provide an access point to and from MTC UE 105, may handle forwarding of data packets for MTC UE 105, and may act as a local anchor point during handover procedures between eNBs 115. SGW 130 may interface with PGW 135 through an S5/S8 interface 132. S5/S8 interface 132 may be implemented, for example, using GTPv2.

PGW device 135 (also simply referred to as PGW 135) may function as a gateway to IP network 160 through an SGi interface 162. A particular MTC UE 105, while shown in FIG. 1 connected to a single SGW 130, may, in some embodiments, be connected to multiple PGWs 135, one for each packet network with which MTC UE 105 communicates.

MME 125 may communicate with SGW 130 through an S11 interface 122. S11 interface 122 may be implemented, for example, using GTPv2. S11 interface 122 may be used to create and manage a new session for a particular MTC UE 105. S11 interface 122 may be activated when MME 125 needs to communicate with SGW 130, such as when the particular MTC UE 105 attaches to ePC 120, when bearers need to be added or modified for an existing session for the particular MTC UE 105, when a connection to a new PGW 135 needs to created, or during a handover procedure (e.g., when the particular MTC UE 105 needs to switch to a different SGW 130).

SCEF 140 may include a network or computational device that provides the capability for the creation, verification, and testing of MTC services. In one implementation, SCEF 140 may exchange control plane signaling with MME 125 via a T6a interface 142. In one implementation, SCEF 140 may be included as part of a control plane bearer path between MTC UE 105 and application server 165.

HSS device 150 may store information associated with MTC UEs 105 and/or information associated with users/owners of MTC UE 105. For example, HSS device 150 may store subscriber profiles that include authentication and access authorization information. As described further herein, the subscriber profiles may store use restrictions or bearer preferences for a particular MTC UE 105, such as restricting a particular MTC UE 105 to only control plane signaling. MME 125 may communicate with HSS device 150 through an S6a interface 152. S6a interface 152 may be implemented, for example, using a Diameter protocol.

IP network 160 may include one or multiple networks of one or multiple types. For example, IP network 160 may include the Internet, the World Wide Web, an IP Multimedia Subsystem (IMS) network, a cloud network, a wide area network (WAN), a metropolitan area network (MAN), a service provider network, a private IP network, some other type of backend network, and so forth. IP network 160 may include, for example, an IMS network, which may provide data and multimedia services to MTC UE 105, based on Session Initiation Protocol (SIP). As illustrated, according to an exemplary embodiment, IP network 160 includes application server 165. According to other exemplary embodiments, application server 165 and/or a portion thereof may be implemented in a different network.

Application server 165 may receive and process MTC data from MTC UE 105. In one implementation, MTC UE 105 may interact with application server 165 using a non-IP bearer. In another implementation, application server 165 and MTC UE 105 may interact with one another using HTTP, secure HTTP (HTTPS), or another type of protocol.

Devices and networks of environment 100 may be interconnected via wired and/or wireless connections. While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

Typical network usage patterns for MTC UE 105 include (1) short messages and infrequent messages, such as meters sending daily readings, or (2) high bandwidth data or very frequent communication, such as industrial sensors, health monitors, agricultural sensors, etc. Usage pattern 1 can be supported by wireless network 102 using a control plane (e.g., NAS signaling between a UE and an MME). Usage pattern 2 can be supported by wireless network 102 using a user plane (e.g., using packet data network (PDN) connection setup mechanisms). Advanced wireless systems provide for non-IP communication mechanisms between a UE and an application server to better support MTC. However, the mechanisms provided are not sufficient to enforce MTC device (e.g., MTC UE 105) behavior. For example, depending on use cases, payment plans, etc., a service provider (for wireless network 102) may want to restrict a MTC device to using only the control plane and may disallow use of the user plane. These types of restrictions are not supported by the various 3GPP implementations for example, but may be supported using subscriber profiles in an HSS, such as HSS 150.

According to implementations described herein, each MTC UE 105 may be registered with wireless network 102. Each registration may provide a unique device identifier (such as an International Mobile Station Equipment Identity (IMEI), serial number, etc.) for each MTC UE 105 and particular data types to be generated/sent by MTC UE 105. Registration may also indicate, for example, the owner of MTC UE 105, a device ID for MTC UE 105, a device certificate, and an IP address for MTC UE 105. Based on, for example, the particular data types to be generated/sent by MTC UE 105, wireless network 102 may assign a non-IP access point name (APN) configuration to the subscriber profile of MTC UE 105. According to an implementation, the registered MTC UEs 105 may also be passed through an onboarding process, which makes sure each MTC device has the necessary software (firmware) loaded for security and best practices to maximize network performance. In some implementations, software or firmware upgrades for MTC UE 105 can be done securely through a wireless network over-the-air service, which can use multicast for large-scale device upgrades. In other implementations, such over-the-air services are not compatible with MTC UE 105.

Figure 2:
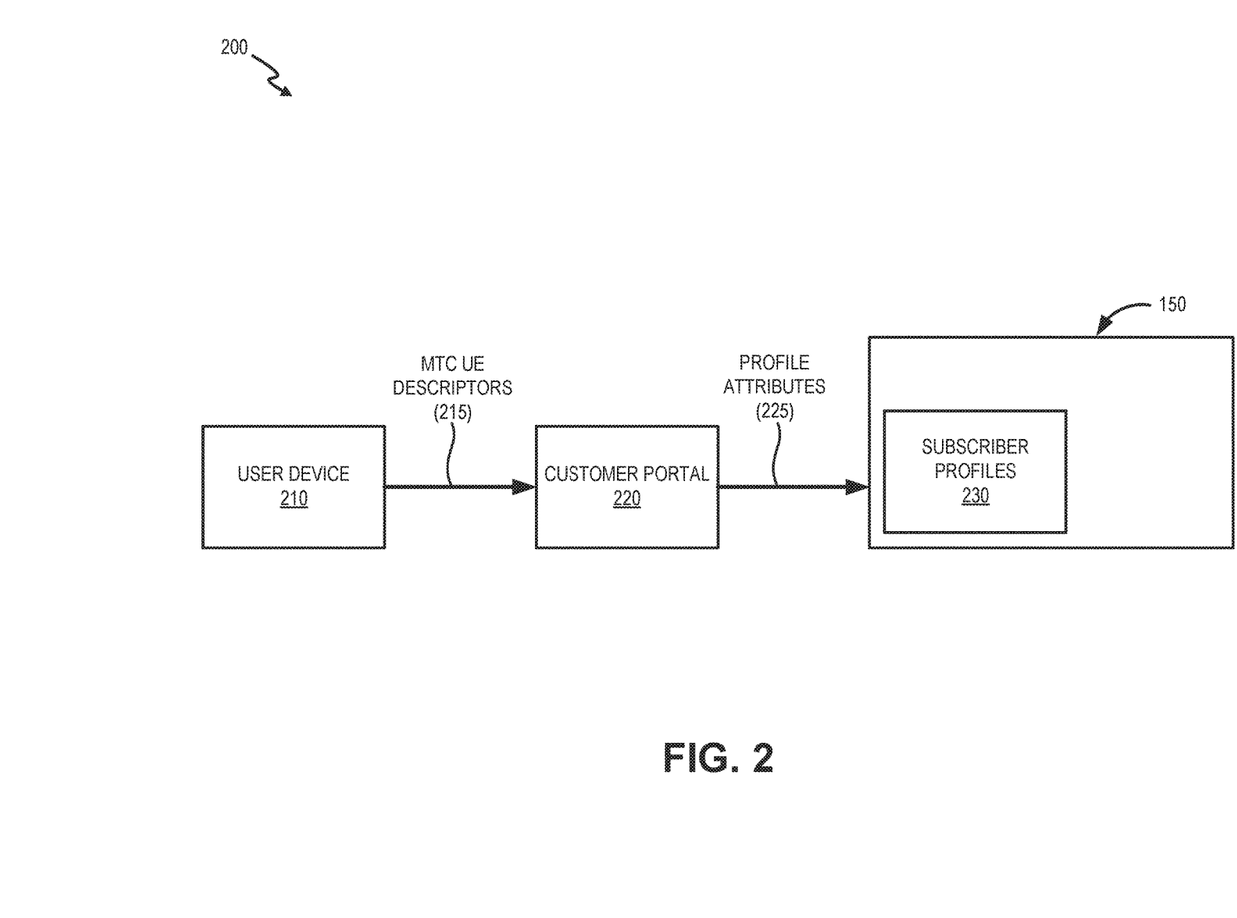
FIG. 2 is a diagram that depicts an exemplary network environment for registering an MTC device of FIG. 1.

FIG. 2 is a diagram that depicts an exemplary network environment 200 for registering one of MTC UE 105. As shown in FIG. 2, network environment 200 may include user a user device 210, a customer portal 220, and subscriber profiles 230 for HSS 150.

User device 210 may include a communicative and computational device. User device 210 may be implemented as a mobile device, a portable device, or a stationary device. For example, user device 210 may be implemented as a smartphone, a tablet, a computer (e.g., a laptop, a desktop, a palmtop, etc.), a personal digital assistant, a terminal, and so forth. According to an exemplary embodiment, user device 210 provides users with access to customer portal 220. For example, user device 210 may include a client, such as a web browser or other suitable software application. Users may be considered an operator of user device 210. For example, a user may be a network administrator, a third party (e.g., a vendor, a merchant, a potential customer) user of MTC UE 105, an owner of MTC UE 105, and so forth.

Customer portal 220 may include a network device that provides MTC UE management services. Users of the wireless network 102 may manage (e.g., configure, issue commands, update, monitor, etc.) MTC UE 105 and other network elements via user device 210. Customer portal 220 may provide various MTC management services such that customers may manage their devices on-the-fly and/or remotely. Additionally, customer portal 220 may allow users to manage in an automated manner based on a management schedule. For example, a user may configure a time schedule during which MTC UE configuration data (e.g., a software update) pertaining to multiple MTC UE 105 is updated.

According to an implementation, customer portal 220 may provide a user interface (e.g., a web site or another network access) to register one or multiple MTC UE 105. For example, a user may use user device 210 to input MTC UE descriptors 215 to customer portal 220. Each of MTC UE descriptors 215 may include the unique device identifier (such as an International Mobile Station Equipment Identity (IMEI), serial number, etc.) for each MTC UE 105 and particular data types to be generated/sent by the MTC UE 105. The particular data types may indicate for example, the type/frequency of messages MTC UE 105 will send (e.g., short/infrequent messages or high bandwidth/frequent messages). MTC UE descriptors 215 may also indicate, for example, the owner of MTC UE 105, a device certificate, and an IP address for MTC UE 105. Based on, for example, MTC UE descriptors 215, customer portal 220 may assign profile attributes 225. For example, based on the particular data types to be generated/sent by MTC UE 105, customer portal 220 may define, in profile attributes 225, a non-IP APN configuration for MTC UE 105.

Profile attributes for each MTC UE 105 may be stored by HSS 150 as subscriber profiles 230. Subscriber profiles 230 may be stored in a database, memory, or another storage medium of HSS 150. As described further herein, subscriber profiles 230 may be accessed by HSS 150 in response to a request (e.g., an update location request, etc.) from MME 125 and may be used to configure a bearer path for an MTC UE 105.

Devices and networks of environment 200 may be interconnected via wired and/or wireless connections. While FIG. 2 shows exemplary components of network environment 200, in other implementations, network environment 200 may include fewer components, different components, differently-arranged components, or additional components than depicted in FIG. 2. Additionally or alternatively, one or more components of network environment 200 may perform functions described as being performed by one or more other components of network environment 200.

Figure 3:
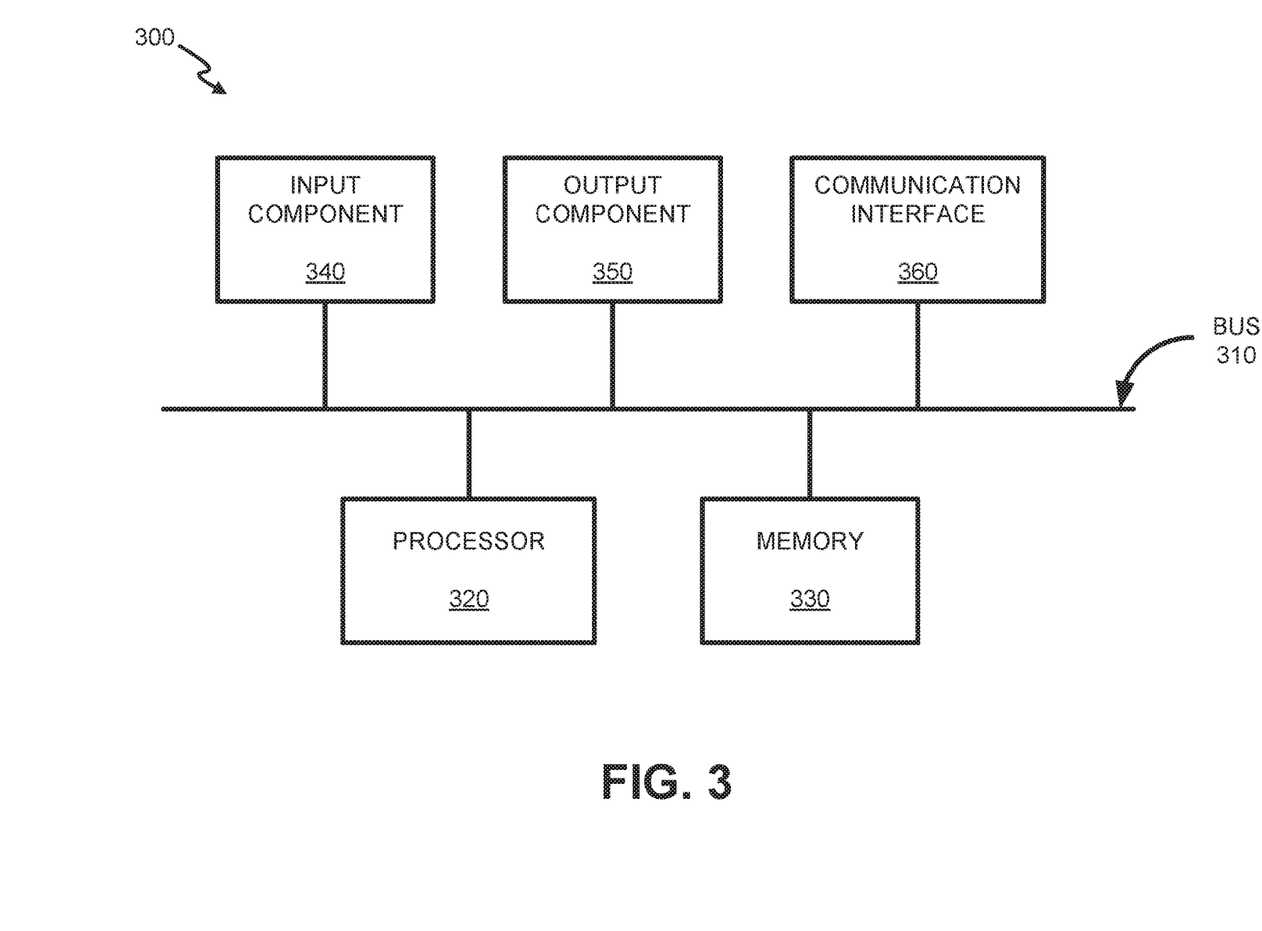
FIG. 3 shows a diagram of exemplary components that may be included in a computing device included in the network environment shown in FIGS. 1 and 2.

FIG. 3 is a diagram illustrating exemplary components of a device 300. Device 300 may correspond, for example, to a component of MTC UE 105, eNB 115, MME 125, SGW 130, PGW 135, SCEF 140, HSS 160, application server 165, or another component of wireless network 102. Alternatively or additionally, MTC UE 105, eNB 115, MME 125, SGW 130, PGW 135, SCEF 140, HSS 160, and application server 165 may include one or more devices 300 and/or one or more components of device 300.

Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. Communication interface 360 may, for example, receive RF signals and transmit them over the air to MTC UE 105/eNB 115, and receive RF signals over the air from eNB 115/ MTC UE 105. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
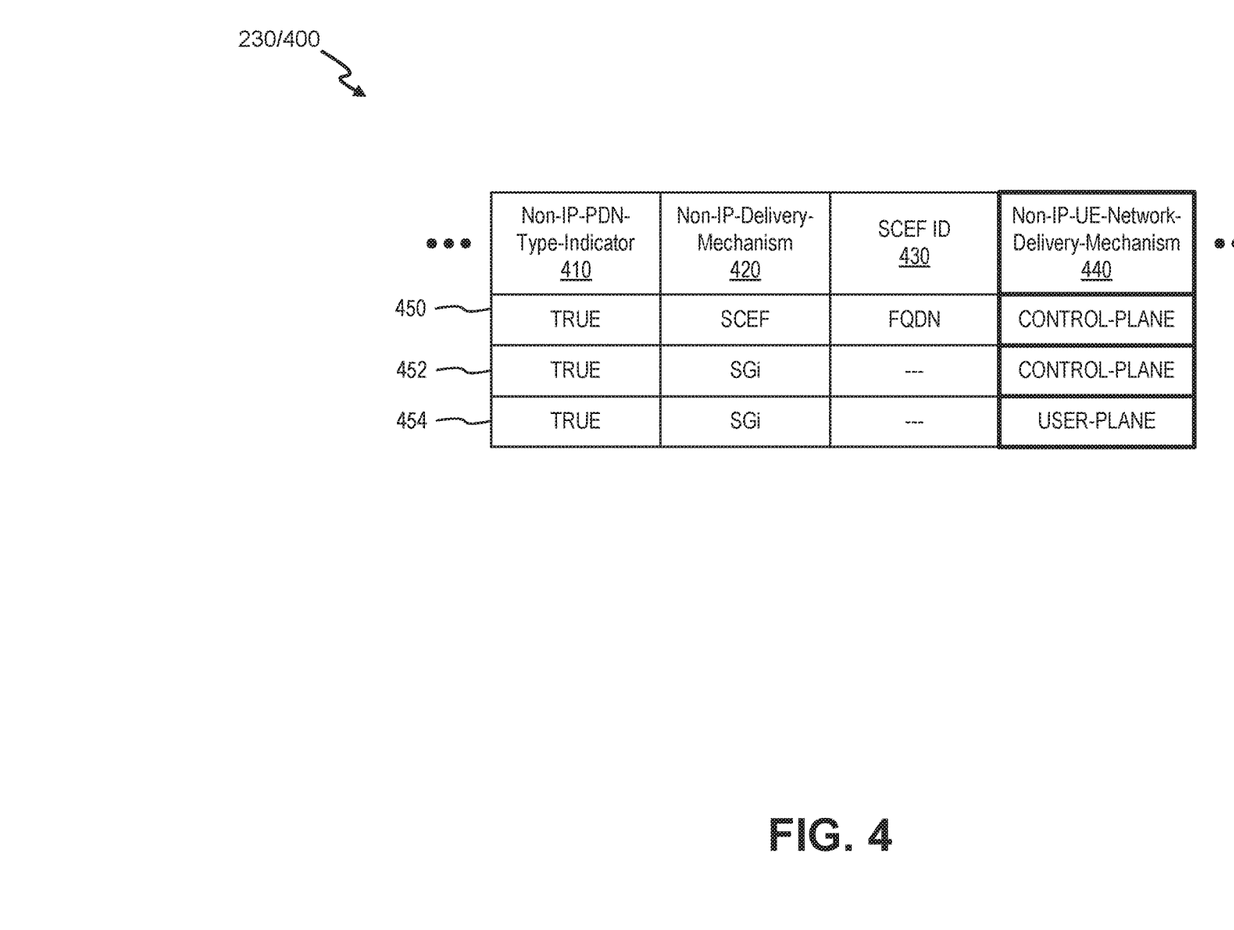
FIG. 4 is a diagram illustrating a portion of a subscriber profile of FIG. 2.

FIG. 4 is a diagram illustrating a portion 400 of subscriber profiles 230. As shown in FIG. 4, subscriber profiles 230 may include a Non-IP-PDN-Type-Indicator field 410, a Non-IP-Delivery-Mechanism field 420, a SCEF identifier (ID) field 430, a Non-IP-UE-Network-Delivery-Mechanism field 440, and a variety of entries 450, 452, and 454. Advanced wireless systems provide enhanced specifications to support machine-type communications (MTC). Specifically, among other changes, 3GPP introduced a non-IP communication mechanism between a UE and an application server, which may be configured, in part, using data from Non-IP-PDN-Type-Indicator field 410, Non-IP-Delivery-Mechanism 420, and SCEF ID field 430. As described further herein, Non-IP-UE-Network-Delivery-Mechanism field 440 provides additional control for the portion of a bearer path (e.g., for a non-IP APN) between MTC UE 105 and ePC 120. Application of Non-IP-UE-Network-Delivery-Mechanism field 440 may allow for parameters that permit centralized control of the user plane and the control plane to support machine-type communications without relying on local configurations within each MME 125. Thus, a service provider can more effectively balance overall traffic loads across ePC 120.

Figure 5A:
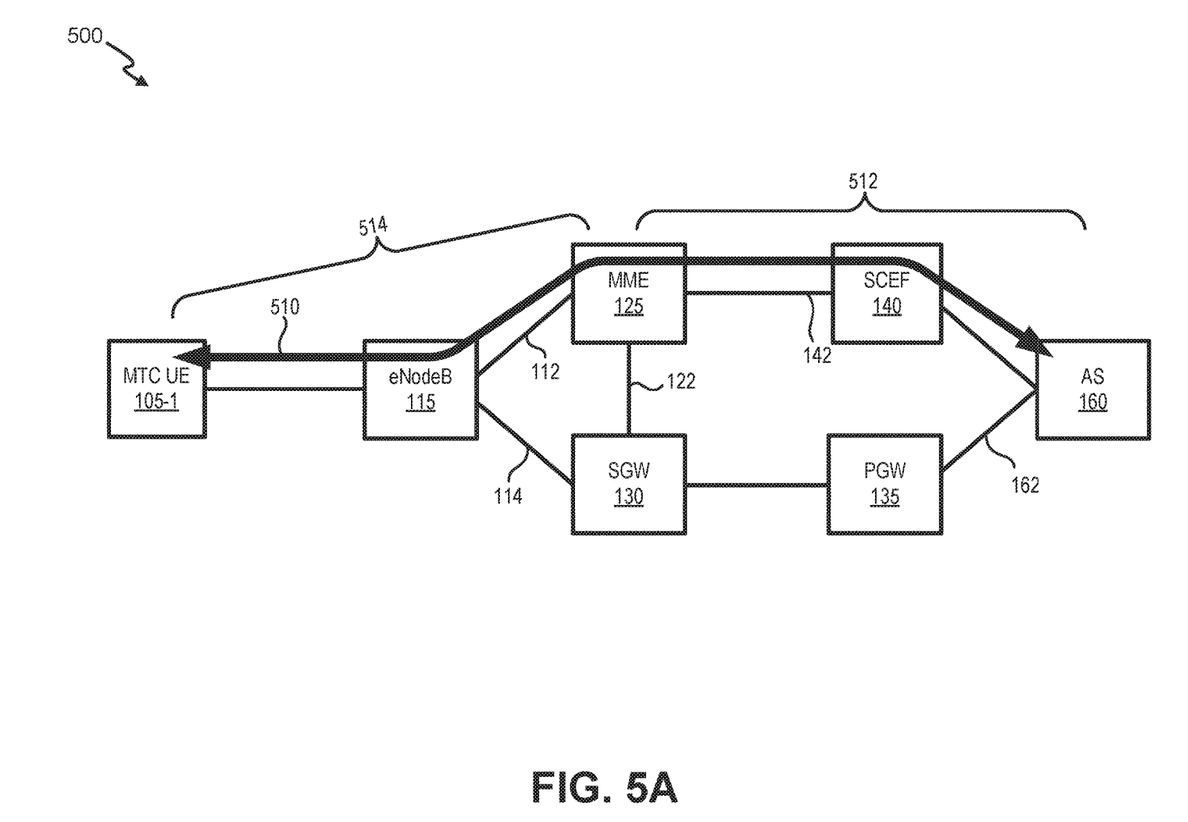
FIGS. 5A-5C are schematics of non-IP bearer paths for a portion of the network environment of FIG. 1.
Figure 5B:
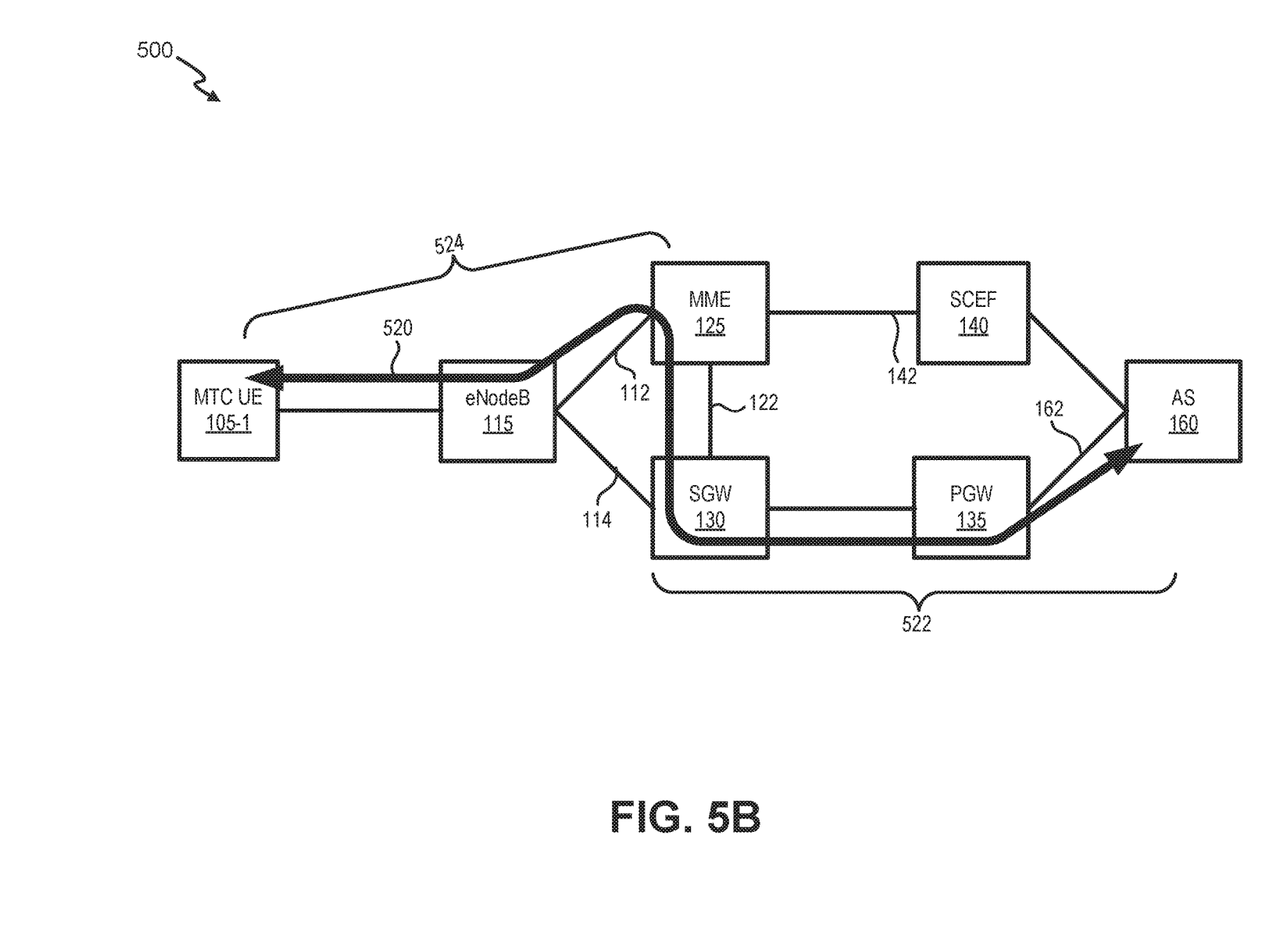
Figure 5C:
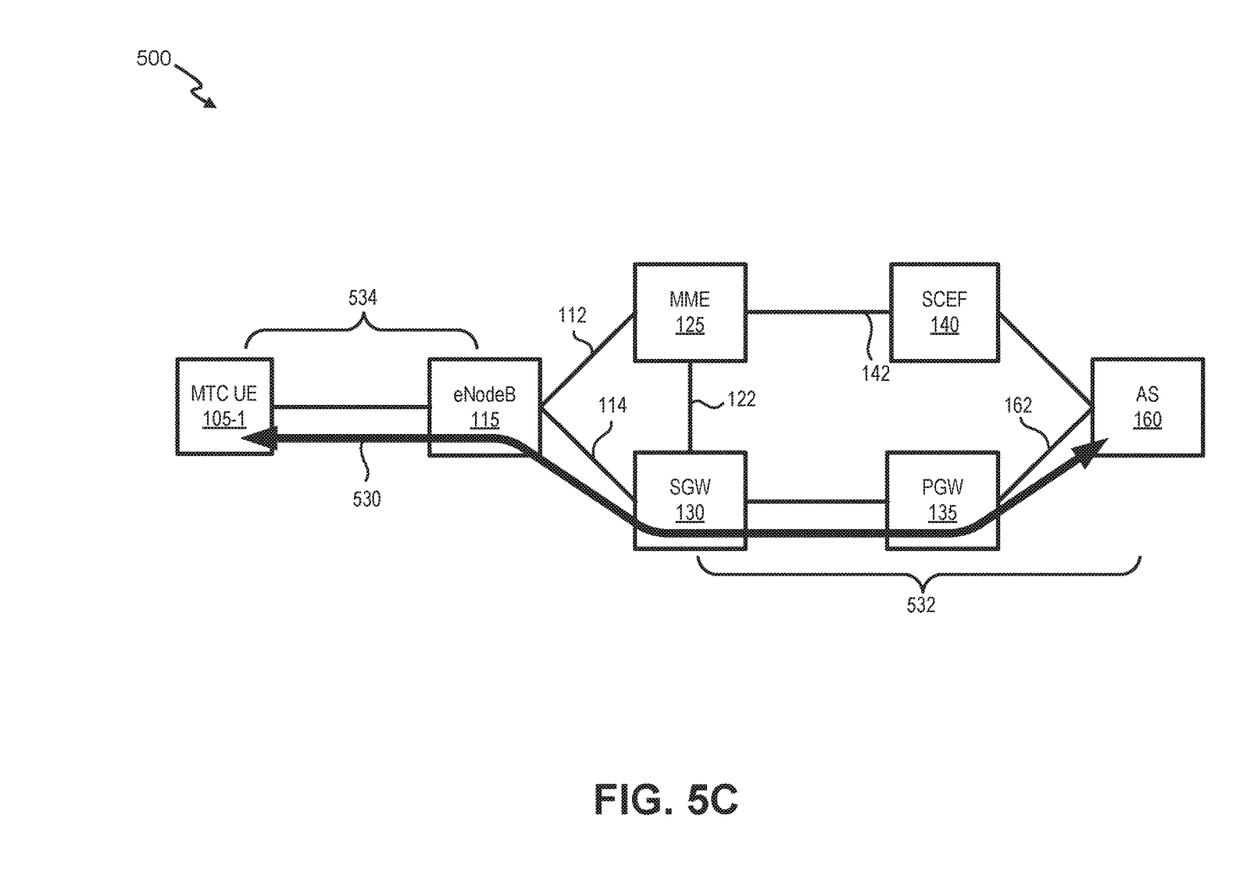

Fields of FIG. 4 are described herein in conjunction with FIGS. 5A-5C. FIGS. 5A-5C provide schematics of non-IP bearer paths for a portion 500 of network environment 100. More particularly, FIGS. 5A-5C demonstrate routes non-IP bearer communications can take based on the configurations of subscriber profiles 230 shown in FIG. 4. As shown in FIG. 5A, one non-IP bearer path 510, corresponding to entry 450 of FIG. 4, includes a route between MTC UE 105 and MME 125 (via eNB 115), MME 125 and SCEF 140, and SCEF 140 and application server 165. As shown in FIG. 5B, another non-IP bearer path 520, corresponding to entry 452 of FIG. 4, includes a route between MTC UE 105 and MME 125 (via eNB 115), MME 125 and SGW 130, SGW 130 and PGW 135, and PGW 135 and application server 165. As shown in FIG. 5C, yet another non-IP bearer path 530, corresponding to entry 454 of FIG. 4, includes a route between MTC UE 105 and eNB 115, eNB 115 and SGW 130, SGW 130 and PGW 135, and PGW 135 and application server 165.

Advanced wireless systems allow controlling of bearer paths 510, 520, and 530 to a certain extent using APN configurations. The non-IP APN configuration includes Attribute-Value Pair (AVP) parameters for Non-IP-PDN-Type-Indicator field 410, Non-IP-Delivery-Mechanism 420, and SCEF ID field 430 (in addition to other AVP parameters). Non-IP-PDN-Type-Indicator field 410 may be a binary (i.e., "True"/"False") value to indicate use of non-IP delivery. Assuming a value for Non-IP-PDN-Type-Indicator field 410 is True, Non-IP-Delivery-Mechanism field 420 may be used to indicate "SCEF-based" or "SGi-based." If Non-IP-Delivery-Mechanism field 420 is SCEF-based, SCEF ID field 430 may be used to provide a fully qualified domain name (FQDN) for SCEF 140 (e.g., for use in establishing bearer path 510 of FIG. 5A). If Non-IP-Delivery-Mechanism field 420 is SGi-based, bearer path 520 of FIG. 5B or bearer path 530 of FIG. 5C may be established.

Thus, using APN configuration parameters, and particularly Non-IP-Delivery-Mechanism field 420, portions of bearer path 510 and 520 can be controlled. As shown in FIGS. 4 and 5A, portion 512 (including MME 125, SCEF 140, and application server 165) of bearer path 510 (corresponding to entry 450) may be controlled by assigning Non-IP-Delivery-Mechanism field 420 to "SCEF" and providing a FQDN for SCEF ID field 430. As shown in FIGS. 4 and 5B, portion 522 (including MME 125, SGW 130, PGW 135, and application server 165) of bearer path 520 (corresponding to entry 452) may be controlled by assigning Non-IP-Delivery-Mechanism field 420 to "SGi-based." Similarly, as shown in FIGS. 4 and 5C, portion 532 (including SGW 130, PGW 135, and application server 165) of bearer path 530 (corresponding to entry 454) may be controlled by assigning Non-IP-Delivery-Mechanism field 420 to "SGi-based."

The current mechanisms of some advanced wireless systems do not allow specification and control of the bearer path to be used for a Non-IP APN between MTC UE 105 and ePC 120. Particularly, portion 514 (between MTC UE 105 and MME 125) of bearer path 510, portion 524 (between MTC UE 105 and MME 125) of bearer path 520, and portion 534 (between MTC UE 105 and eNB 115) of bearer path 530 are not specified. Some advanced wireless systems assume a local configuration within MME 125 would determine portions 514, 524, and 534. However, with hundreds of millions of new MTC UEs being added to network environment 100, an ability to control bearer path portions 514, 524, and 534 for a device or for a group of devices is needed.

As shown in FIG. 4, Non-IP-UE-Network-Delivery-Mechanism field 440 enhances APN configuration within subscriber profiles 230 of HSS 150. Non-IP-UE-Network-Delivery-Mechanism field 440 may differentiate bearer paths between eNB 115 and ePC 120 by identifying an MTC-ePC delivery mechanism between the MTC device and the ePC network. More particularly, assuming a value for Non-IP-PDN-Type-Indicator field 410 is True, Non Non-IP-UE-Network-Delivery-Mechanism field 440 may correspond to a new AVP that may be used to indicate "Control-Plane" or "User-Plane."

Assigning Non-IP-UE-Network-Delivery-Mechanism field 440 to Control-Plane indicates that information between MTC UE 105 and ePC network 120 would be exchanged over NAS using S1-MME interface 112. When MME 125 obtains subscriber profile information from HSS 150 with Non-IP-UE-Network-Delivery-Mechanism field 440 set to Control-Plane, MME 125 can then utilize Non-IP-Delivery-Mechanism field 420 to determine if information is to be delivered to application server 165 through SCEF 140 or SGW130/PGW 135.

Assigning Non-IP-UE-Network-Delivery-Mechanism field 440 to User-Plane indicates that information between MTC UE 105 and ePC network 120 would be exchanged over S1-U interface 114. When MME 125 obtains subscriber profile information from HSS 150 with Non-IP-Delivery-Mechanism field 420 set to User-Plane, MME 125 can ignore values in Non-IP-Delivery-Mechanism 420. Instead, MME 125 will follow existing procedures to set up paths between MTC UE 105 and SGW 130 and between SGW 130 and PGW 135.

FIGS. 4 and 5A-5C disclose examples of AVP indicators in ePC communications that may be used to control utilization of network paths for machine-type communications. According to other embodiments, other indicators and signal types may be used to differentiate use of a control plane and a user plane between MTC UE 105 and devices in ePC 120.

Figure 6:
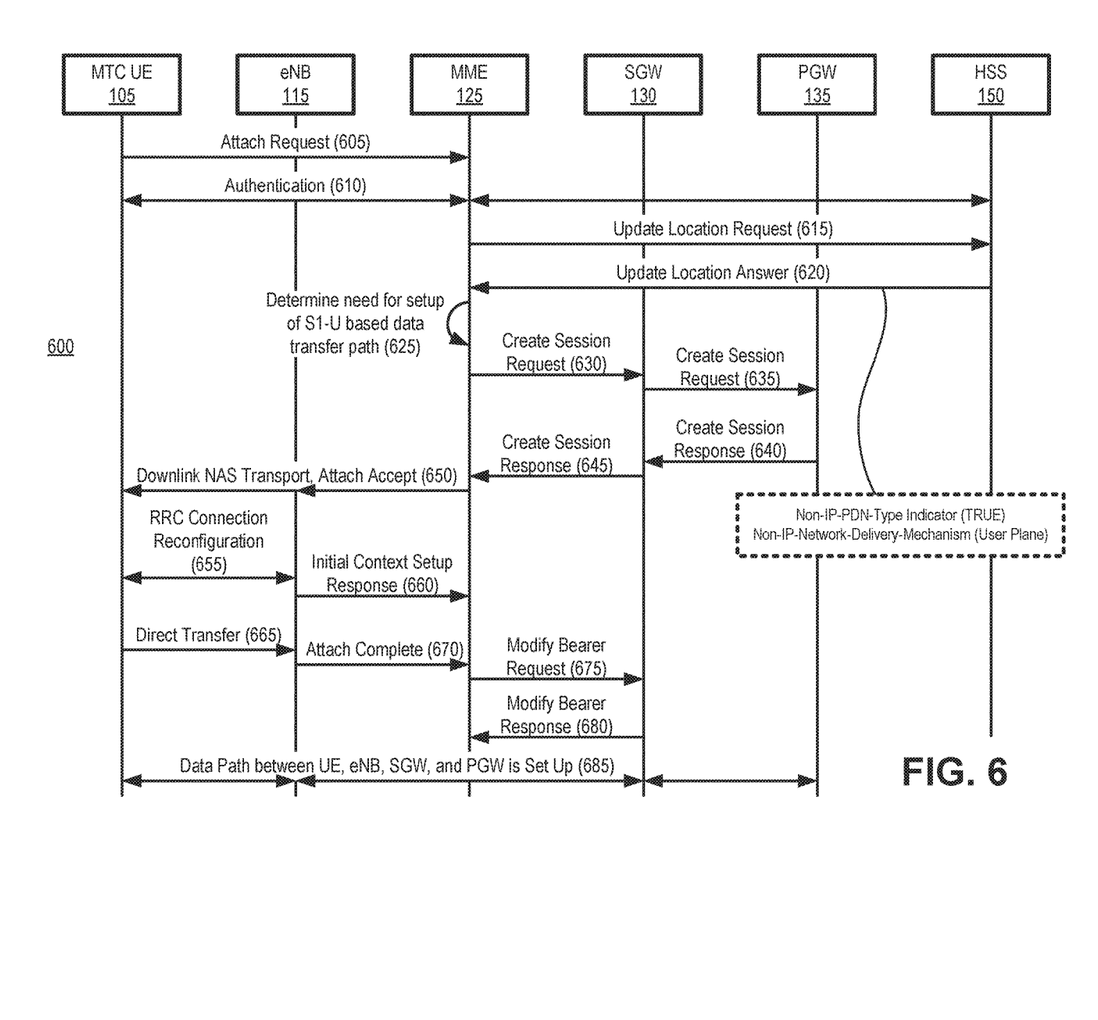
FIG. 6 is a diagram showing communications in a portion of the network environment of FIG. 1.

FIG. 6 is a diagram showing communications in a portion 600 of network environment 100. FIG. 6 represents communications for applying a User-Plane setting in Non-IP-UE-Network-Delivery-Mechanism field 440 when configuring a bearer path. Network portion 600 may include MTC UE 105, eNB 115, MME 125, SGW 130, PGW 135, and HSS 150. Assume for FIG. 6, that MTC UE 105 has been previously registered through customer portal 220 to provide high bandwidth data or very frequent communication. Thus, the subscriber profiles 230 in HSS 150 for MTC UE 105 would dictate use of a non-IP PDN over a user plane.

As shown in FIG. 6, MTC UE 105 may provide an initial attachment request 605 to MME 125. Initial attachment request 605 may be provided, for example, via eNB 115 over a physical random access channel (PRACH) to establish a connection with ePC 120. The attach request may include the unique identifier associated with MTC UE 105. In response to initial attachment request 605, MME 125 may perform an authentication process 610 in which MME 125 may retrieve UE profile data from HSS 150. The UE profile data may identify UE information and subscription information for MTC UE 105.

MME 125 may also send an update location request 615 to HSS 150 to update/confirm the location of MTC UE 105. Update location request 615 may be sent via S6a interface 152. In response, HSS 150 access subscriber profiles 230 and assemble an update location answer 620. Update location answer 620 may include, among other information, APN configuration information specific to MTC UE 105 (e.g., high bandwidth data or very frequent communication). Thus, using the illustrative format described above in connection with FIG. 4, update location answer 620 may include Non-IP-PDN-Type-Indicator field 410 of "True" and Non-IP-UE-Network-Delivery-Mechanism field 440 of "User-Plane." HSS 150 may use S6a interface 152 to provide update location answer 620 to MME 125.

MME 125 may receive update location answer 620 and, in response, determine 625 the need to set up an S1-U-based data transfer path. Particularly, update location answer 620 provides information that may eliminate a local user plane/control plane determination by MME 125. Given the Non-IP-UE-Network-Delivery-Mechanism field 440 of "User-Plane, MME 125 may then follow existing wireless systems procedures, such as 3GPP procedures, to establish default bearer paths between MTC UE 105 and SGW 130 and between SGW 130 and PGW 135. Thus, MME 125 provides a create session request 630 to SGW 130, and SGW 130 provides a create session request 635 to PGW 135, asking PGW 135 to establish a bearer. In response to create session request 635, PGW 135 establishes the bearer and responds back to SGW 130 with create session response 640. SGW 130 may then respond to MME 125 with create session response 645.

After receiving create session response 645, MME 125 provides a downlink NAS transport message to eNB 115 that includes an attach accept message 650. Message 650 may include information for MT UE 105 to generate a radio resource control (RRC) connection request. MME 125 may use S1-MME interface 112 (i.e., S1-AP) to provide message 650 to eNB 115. eNB 115 may pass message 650 to MTC UE 105. MTC UE 105 may receive message 650, and MTC UE 105 and eNB 115 may conduct an RRC connection reconfiguration 655 to establish a bearer over an S1-U interface. In response to RRC connection reconfiguration 655, eNB 115 may provide an initial context setup response message 660 to MME 125. Still referring to FIG. 6, the activation of the bearer is completed using direct transfer message 665, attach complete message 670, modify bearer request 675, and modify bearer response 680. Thus, as a result of the subscriber profile in HSS 150, a data path 685 is set up using MTC UE 105, eNB 115, SGW 130, and PGW 135. Data path 685 may correspond, for example, to bearer path 530 of FIG. 5C.

Figure 7:
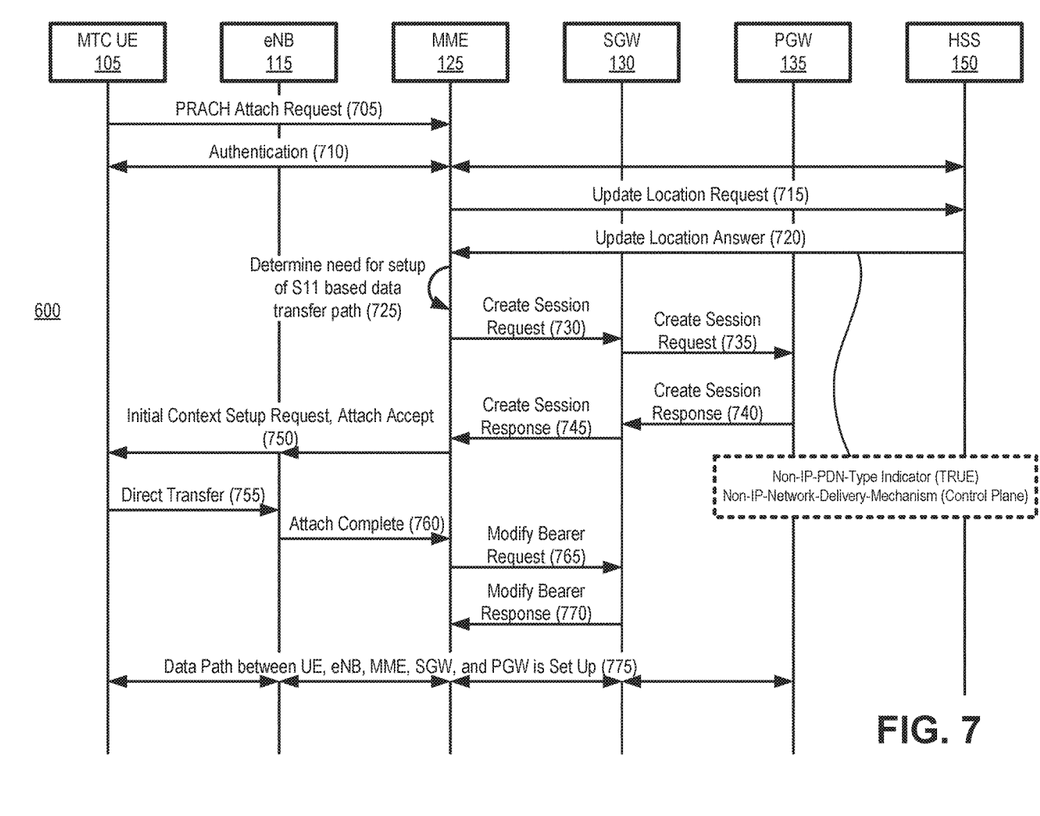
FIG. 7 is a diagram showing additional communications in a portion of the network environment of FIG. 1.

FIG. 7 is a diagram showing different communications in network portion 600. FIG. 7 represents communications for applying a Control-Plane setting in Non-IP-UE-Network-Delivery-Mechanism field 440 when configuring a bearer path. Assume for FIG. 7, that MTC UE 105 has been previously registered through customer portal 220 to provide short messages and/or infrequent messages. Thus, the subscriber profiles 230 in HSS 150 for MTC UE 105 would dictate use of a non-IP PDN over a control plane.

As shown in FIG. 7, MTC UE 105 may provide an initial attachment request 705 to MME 125. Initial attachment request 705 may be provided, for example, via eNB 115 over a physical random access channel (PRACH) to establish a connection with ePC 120. The attach request may include a unique identifier for MTC UE 105. In response to initial attachment request 705, MME 125 may perform an authentication process 710 in which MME 125 may retrieve UE profile data from HSS 150. The UE profile data may identify UE information and subscription information for MTC UE 105.

MME 125 may also send an update location request 715 to HSS 150 to update/confirm the location of MTC UE 105. Update location request 715 may be sent via S6a interface 152. In response, HSS 150 access subscriber profiles 230 and assemble an update location answer 720. Update location answer 720 may include, among other information, APN configuration information specific to MTC UE 105 communications (e.g., short messages and infrequent messages). Thus, using the illustrative format described above in connection with FIG. 4, update location answer 720 may include Non-IP-PDN-Type-Indicator field 410 of "True" and Non-IP-UE-Network-Delivery-Mechanism field 440 of "Control-Plane." HSS 150 may use S6a interface 152 to provide update location answer 720 to MME 125.

MME 125 may receive update location answer 720 and, in response, determine 725 the need to set up an S11-U-based data transfer path. Thus, MME 125 provides a create session request 730 to SGW 130 and SGW 130 provides a create session request 735 to PGW 135, asking PGW 135 to establish a bearer. In response to create session request 735, PGW 135 establishes the bearer and respond back to SGW 130 with create session response 740. SGW 130 may then respond to MME 125 with create session response 745.

After receiving create session response 745, MME 125 will provide to eNB 115 an initial context setup request and attach accept message 750. MME 125 may use S1-MME interface 112 (i.e., S1-AP) to provide message 750 to eNB 115. eNB 115 may pass information from message 750 to MTC UE 105. MTC UE 105 may receive attach accept message 750, and the activation of the bearer is completed using direct transfer message 755, attach complete message 760, modify bearer request 765, and modify bearer response 770. As a result, a data path 775 is set up using MTC UE 125, eNB 115, MME 125, SGW 130, and PGW 135. Data path 775 may correspond, for example, to bearer path 520 illustrated in FIG. 5B.

While FIGS. 6 and 7 illustrate exemplary messaging and describe exemplary processes that control utilization of network paths for machine-type communications, according to other embodiments, MTC UE 105 and/or network elements of network portion 600 (e.g., MME 125, HSS 15/0, etc.) may perform additional, different, and/or fewer processes to provide for the attachment of UE 105 to ePC network 120. For example, messages similar to those explained above in FIG. 7 may be used to set up a bearer path using MTC UE 105, eNB 115, MME 125, and SCEF 140 when subscriber profiles 230 in HSS 150 for MTC UE 105 provide an FQDN in SCEF ID field 430. Alternatively, new or modified messages and/or new or modified interfaces associated with the network elements may be implemented to accomplish the same tasks as described.

Figure 8:
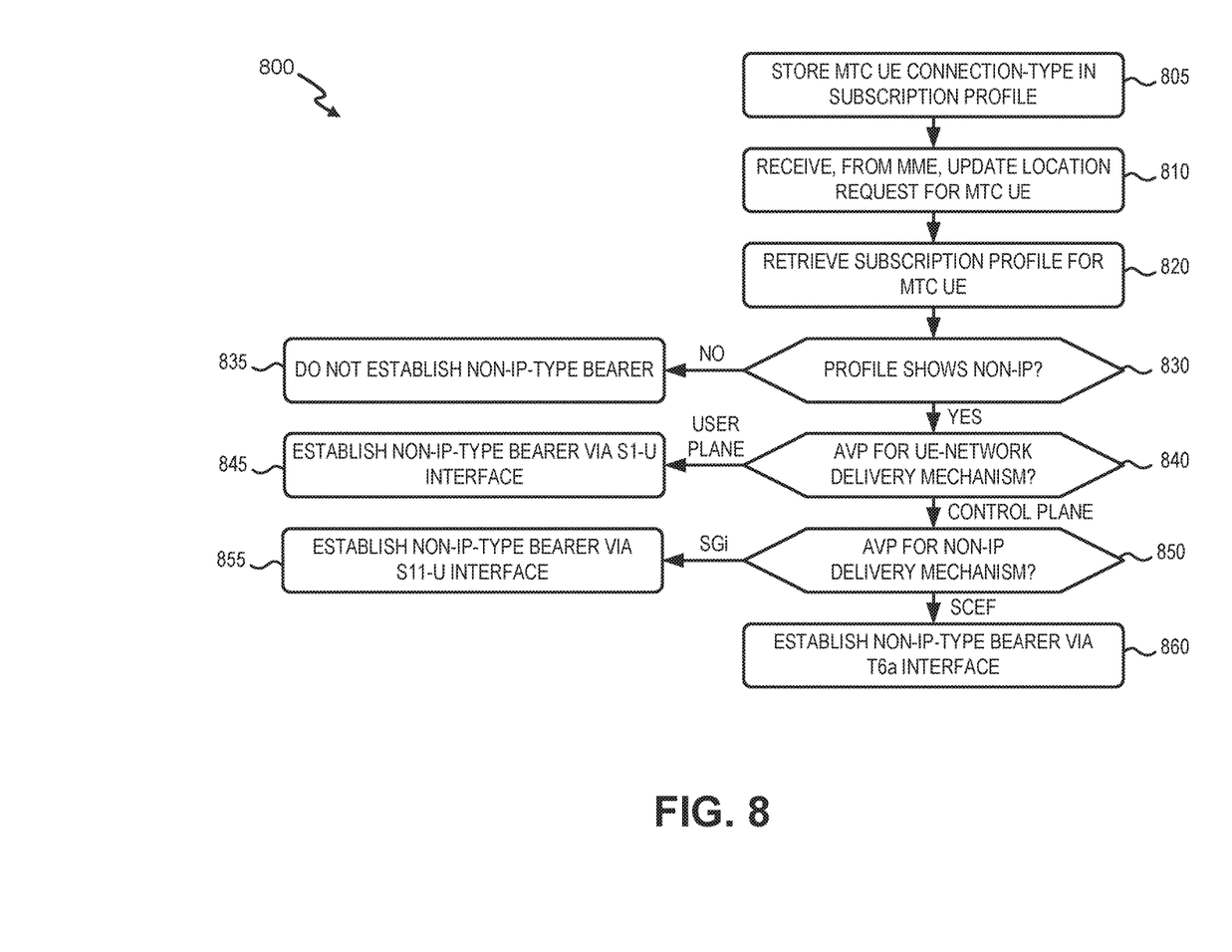
FIGS. 8 and 9 are flow diagrams that illustrate an exemplary process for controlling utilization of network paths for machine-type communications, according to an implementation described herein.
Figure 9:
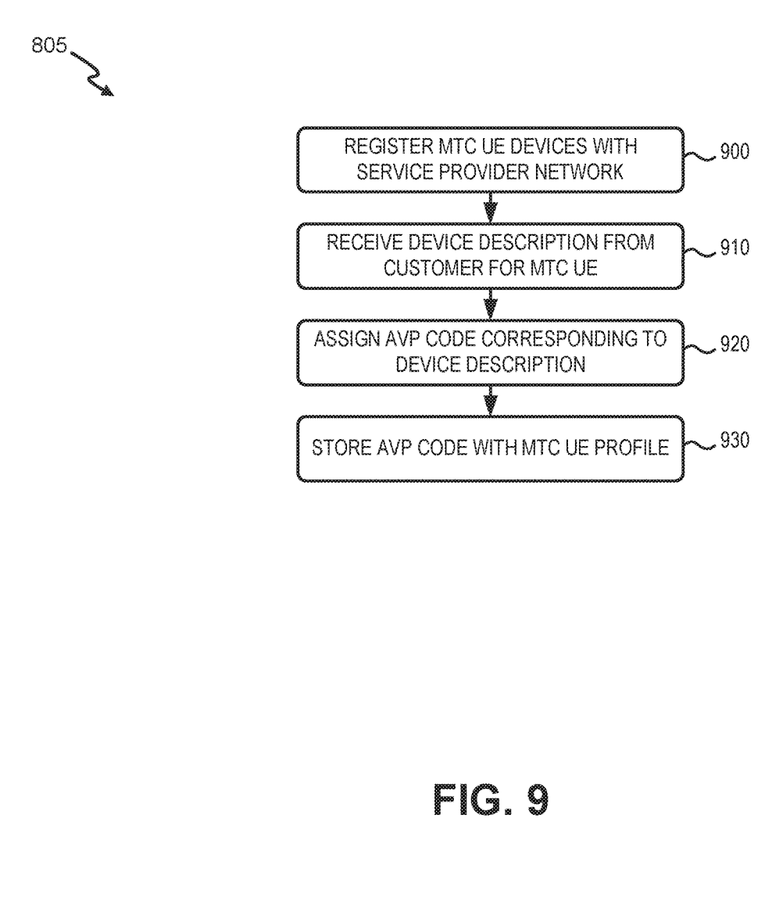

FIGS. 8 and 9 are flow diagrams illustrating an exemplary process 800 for controlling utilization of network paths for machine-type communications. In one implementation, process 800 may be implemented by MME 125 and HSS 150. In another implementation, process 800 may be implemented by HSS 150 and MME 125 in conjunction with one or more other devices in network environment 100, such as eNB 115 or another device in ePC 120.

Referring to FIG. 8, process 800 may include storing an MTC UE connection type in a subscriber profile (block 805). For example, HSS 150 may receive a subscriber profile 230 for MTC UE 105 that includes an indication of an MTC UE that will use a non-IP PDN. The subscriber profile 230 may further indicate whether the MTC UE 105 will transfer data over a control plane or a user plane.

Process 800 may also include receiving, from an MME, an update location request for the MTC UE (block 810), and, in response, retrieving the MTC UE profile (block 820). For example, as described in connection with FIG. 6, after an initial attachment request 605 from MTC UE 105, MME 125 may send update location request 615 to HSS 150 to update the location of MTC UE 105. HSS 150 may receive update location request 615 and, in response, may retrieve a stored profile for MTC UE 105 from subscriber profiles 230. The stored profile for MTC UE 105 may include, among other information, APN configuration information specific to MTC UE 105. The APN configuration information may include Non-IP-PDN-Type-Indicator field 410, Non-IP-Delivery-Mechanism 420, SCEF ID field 430, and Non-IP-UE-Network-Delivery-Mechanism field 440. HSS 150 may provide the APN configuration information to MME 125, for example, via update location answer 620.

Process 800 may further include determining if the MTC UE profile indicates an MTC UE using a Non-IP bearer (block 830). For example, MME 125 may inspect Non-IP-PDN-Type-Indicator field 410 from update location answer 620.

If the MTC UE profile does not indicate an MTC UE (block 830-No), process 800 may include not establishing a non-IP-type bearer (block 835). For example, if the value of Non-IP-PDN-Type-Indicator field 410 is "False," MME 125 may not identify MTC UE 105 as an MTC device that uses non-IP communications and may proceed to initiate, for example, an IP session for MTE UE 105.

If the MTC UE profile does indicate an MTC UE (block 830—Yes), process 800 may include determining the AVP value for a UE-Network delivery mechanism (block 840). For example, if the value of Non-IP-PDN-Type-Indicator field 410 is "True," MME 125 may identify MTC UE 105 as an MTC device that uses non-IP communications. MME 125 may then inspect Non-IP-UE-Network-Delivery-Mechanism field 440 from update location answer 620.

If the AVP value for the UE-Network delivery mechanism indicates a user plane (block 840—User Plane), process 800 may include establishing a non-IP-type bearer via an S1-U interface (block 845). For example, if the value of Non-IP-UE-Network-Delivery-Mechanism field 440 is "User Plane," MME 125 may follow procedures to set up a path between MTC UE 105 and SGW 130 via S1-U interface 114.

If the AVP value for the UE-Network delivery mechanism indicates a control plane (block 840—Control Plane), process 800 may include determining the AVP value for the non-IP delivery mechanism (block 850). For example, if the value of Non-IP-UE-Network-Delivery-Mechanism field 440 is "Control Plane," MME 125 may inspect Non-IP-Delivery-Mechanism field 420 from update location answer 620.

If the AVP value for the non-IP delivery mechanism indicates an interface via a PGW (block 850-SGi), process 800 may include establishing a non-IP-type bearer via an S11 interface (block 855). For example, if the value of Non-IP-Delivery-Mechanism field 420 in update location answer 620 is "SGi," MME 125 may follow procedures to set up a bearer path including S11 interface 122 between MME 125 and SGW 130.

If the AVP value for the non-IP delivery mechanism indicates an interface via an SCEF (block 850-SCEF), process 800 may include establishing a non-IP-type bearer via a T6a interface (block 860). For example, if the value of Non-IP-Delivery-Mechanism field 420 in update location answer 620 is "SCEF," MME 125 may follow procedures to set up a bearer path including T6a interface 142 between MME 125 and SCEF 140.

Process block 805 may include the process blocks shown in FIG. 9. As shown in FIG. 9, process block 805 may include registering MTC UE devices with a service provider network (block 900), receiving a device description for the MTC UE from a customer (block 910), assigning an AVP code, for a Non-IP-UE-Network-Delivery-Mechanism corresponding to the device description (block 920), and storing the AVP code with the MTC UE profile (block 930). For example, as described above in connection with FIG. 2, a customer using user device 210 may submit MTC UE descriptors 215 to customer portal 220 to register MTC UE 105. MTC UE descriptors 215 may include may include a unique device identifier for the MTC UE 105 and description of particular data types to be generated/sent by the MTC UE 105. Customer portal 220 may use the particular data type descriptions to assign APN configuration values, such as AVP values shown in FIG. 4, for MTC UE 105. The assigned APN configuration values may be stored as subscriber profiles 230 accessible to HSS 150.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 8 and 9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by one or more network devices in an evolved packet core (ePC) network and via a customer portal device, profile attributes for a machine-type communication (MTC) device that is different than the customer portal device, the profile attributes including an access point name (APN) configuration that indicates, for non-Internet Protocol (IP)-type communications, a type of bearer path to be used between the MTC device and the ePC network, wherein the type of bearer path is selected from a user plane and a control plane;
   storing, by the one or more network devices, a subscriber profile for the MTC device, the subscriber profile including the profile attributes;
   receiving, by the one or more network devices and after the storing, an attach request from the MTC device;
   retrieving, by the one or more network devices and based on the attach request, the subscriber profile;
   determining, by the one or more network devices, whether the subscriber profile indicates an APN configuration for a non-IP bearer; and
   when the subscriber profile indicates an APN configuration for a non-IP bearer, implementing, by the one or more network devices and for the MTC device, the type of bearer path between the MTC device and the ePC network, as indicated in the subscriber profile.

2. The method of claim 1, wherein the implementing further comprises:
   when the type of bearer path to be used between the MTC device and the ePC network, as indicated in the subscriber profile, is the user plane, initiating, by the one or more network devices, creation of a non-IP-type bearer that includes a first interface between a base station and a serving gateway (SGW) device; and
   when the type of bearer path to be used between the MTC device and the ePC network, as indicated in the subscriber profile, is the control plane, initiating, by the one or more network devices, creation of a non-IP-type bearer that includes:
      a second interface between a mobility management entity (MME) device and the SGW device, or
      a third interface between the MME device and a service creation environment function (SCEF).

3. The method of claim 2, wherein initiating creation of the non-IP-type bearer that includes the second interface further includes:
   initiating creation of a non-IP-type bearer that includes an interface between the SGW device and a packet data network gateway (PGW) device.

4. The method of claim 2, wherein initiating creation of the non-IP-type bearer that includes the third interface further includes:
   obtaining, from the subscriber profile, a fully qualified domain name (FQDN) for the SCEF.

5. The method of claim 2, wherein the second interface between the MME device and the SGW device includes an S11 interface, and wherein the third interface between the MME device and the SCEF includes a T6a interface.

6. The method of claim 2, wherein the non-IP-type bearer that includes one of the second interface or the third interface uses non-access stratum (NAS) signaling between the MTC device and the MME device.

7. The method of claim 2, wherein initiating creation of the non-IP-type bearer that includes the first interface comprises:
   sending a downlink non-access stratum (NAS) transport message from the MME device to the MTC device via the base station.

8. The method of claim 2, wherein initiating creation of the non-IP-type bearer that includes the second interface comprises:
   sending an initial context setup request from the MME device to the MTC device via the base station.

9. The method of claim 1, wherein the type of bearer path as one of the user plane or the control plane is indicated by an Attribute-Value Pair (AVP).

10. The method of claim 1, further comprising:
    when the subscriber profile does not indicate an APN configuration for a non-IP bearer, initiating, by the one or more network devices, creation of an IP-type bearer for the MTC device.

11. The method of claim 1, wherein the subscriber profile is stored in a memory of a home subscriber server (HSS) in the ePC.

12. The method of claim 1, further comprising:
    receiving, by the customer portal device, a device descriptor for the MTC device, the device descriptor including a description of a particular usage pattern of data to be sent by the MTC device; and assigning, by the customer portal device and based on the description of the particular usage pattern, the type of bearer path.

13. A system comprising one or more network devices in an evolved packet core (ePC) network, the network devices including:
one or more memories to store instructions; and
one or more processors to execute the instructions to:
receive, via a customer portal device, profile attributes for a machine-type communication (MTC) device that is different than the customer portal device, the profile attributes including an access point name (APN) configuration that indicates, for non-Internet Protocol (IP)-type communications, a type of bearer path to be used between the MTC device and the ePC network, wherein the type of bearer path is selected from a user plane and a control plane,
store, in the one or more memories, a subscriber profile for the MTC device, the subscriber profile including the profile attributes,
receive, after storing the subscriber profile, an attach request from the MTC device,
retrieve, based on the attach request, the subscriber profile,
determine whether the subscriber profile indicates an APN configuration for a non-IP bearer, and
when the subscriber profile indicates an APN configuration for a non-IP bearer, implement, for the MTC device, the type of bearer path between the MTC device and the ePC network, as indicated in the subscriber profile.

14. The system of claim 13, wherein, when implementing the type of bearer path between the MTC device and the ePC network, the one or more processors are further to execute the instructions to:
when the type of bearer path to be used between the MTC device and the ePC network, as indicated in the subscriber profile, is the user plane, initiate creation of a non-IP-type bearer that includes a first interface between a base station and a serving gateway (SGW) device, and
when the type of bearer path to be used between the MTC device and the ePC network, as indicated in the subscriber profile, is the control plane, initiate creation of a non-IP-type bearer that includes:
a second interface between a mobility management entity (MME) device and the SGW device, or
a third interface between the MME device and a service creation environment function (SCEF).

15. The system of claim 14, wherein, when initiating creation of the non-IP-type bearer that includes one of the second interface or the third interface, the one or more processors are further to execute the instructions to:
initiate creation of a non-IP-type bearer that includes a S11 interface between the MME device and the SGW device; and
initiate creation of a non-IP-type bearer that includes a T6a interface between the MME device and the SCEF.

16. The system of claim 15, wherein, when initiating creation of the non-IP-type bearer that includes the T6a interface, the one or more processors are further to execute the instructions to:

obtain, from the subscriber profile, a fully qualified domain name (FQDN) for the SCEF.

17. The system of claim 13, wherein the type of bearer path is indicated by an Attribute-Value Pair (AVP) in the subscriber profile.

18. The system of claim 13, further comprising:
the customer portal device including a processor to:
receive, from a user device that is different than the MTC device, a device descriptor for the MTC device, the device descriptor including descriptions of a particular usage pattern of data to be sent by the MTC device; and
assign, based on the description of the particular usage pattern, the type of bearer path, wherein the description of the particular usage pattern indicates a frequency of messages the MTC device will send.

19. A non-transitory computer-readable medium containing instructions executable by at least one processor, the computer-readable medium comprising one or more instructions to:
receive, via a customer portal device, profile attributes for a machine-type communication (MTC) device that is different than the customer portal device, the profile attributes including an access point name (APN) configuration that indicates, for non-Internet Protocol (IP)-type communications, a type of bearer path to be used between the MTC device and an evolved packet core (ePC) network, wherein the type of bearer path is selected from a user plane and a control plane;
store, in one or more memories, a subscriber profile for the profile attributes;
receive, after storing the subscriber profile, an attach request from the MTC device;
retrieve, based on the attach request, the subscriber profile;
determine whether the subscriber profile indicates an APN configuration for a non-IP bearer; and
when the subscriber profile indicates an APN configuration for a non-IP bearer, implement, for the MTC device, the type of bearer path between the MTC device and the ePC network, as indicated in the subscriber profile.

20. The non-transitory computer-readable medium claim 19, wherein the instructions to implement the type of bearer path between the MTC device and the ePC network further comprise one or more instructions to:
initiate creation of a non-IP-type bearer that includes a S11 interface between a mobility management entity (MME) device and a serving gateway (SGW) device of the ePC network, when the type of bearer path to be used between the MTC device and the ePC network, as indicated in the subscriber profile, is the user plane; and
initiate creation of a non-IP-type bearer that includes a T6a interface between the MME device and a service creation environment function (SCEF), when the type of bearer path to be used between the MTC device and the ePC network, as indicated in the subscriber profile, is the control plane.

* * * * *